United States Patent [19]

Young et al.

[11] Patent Number: 4,949,371
[45] Date of Patent: Aug. 14, 1990

[54] FLEXIBLE INTEROPERATIVE X-RAY CASSETTE

[76] Inventors: Patrick J. Young, 505 Rosewood Dr., Benton, Ark. 72015; Sherry C. Faulkner, 153 San Fernando, Galveston, Tex. 77550

[21] Appl. No.: 263,185
[22] Filed: Oct. 27, 1988
[51] Int. Cl.⁵ ............................................. G03B 42/04
[52] U.S. Cl. ................................... 378/184; 378/182; 378/187
[58] Field of Search ............... 378/184, 187, 188, 182, 378/169

[56] References Cited

U.S. PATENT DOCUMENTS 2,894,141 7/1959 Kollock ............................... 378/184
3,504,180 3/1970 Tone ................................... 378/184

Primary Examiner—Carolyn E. Fields
Assistant Examiner—David P. Porta
Attorney, Agent, or Firm—Hermann Ivester

[57] ABSTRACT

An x-ray film cassette is provided which is formed in two mating pieces that snap together to form a sealed cassette. The pieces are formed of a soft, flexible material such as rubber or plastic and can be sterilized. An inside surface of the two pieces is coated with an exposure reduction material and an x-ray negative film is carried in the sealed cassette. The cassette can be opened and closed without the use of tools, and, due to its flexible nature can be used to obtain x-ray pictures of internal body organs during surgery.

20 Claims, 1 Drawing Sheet

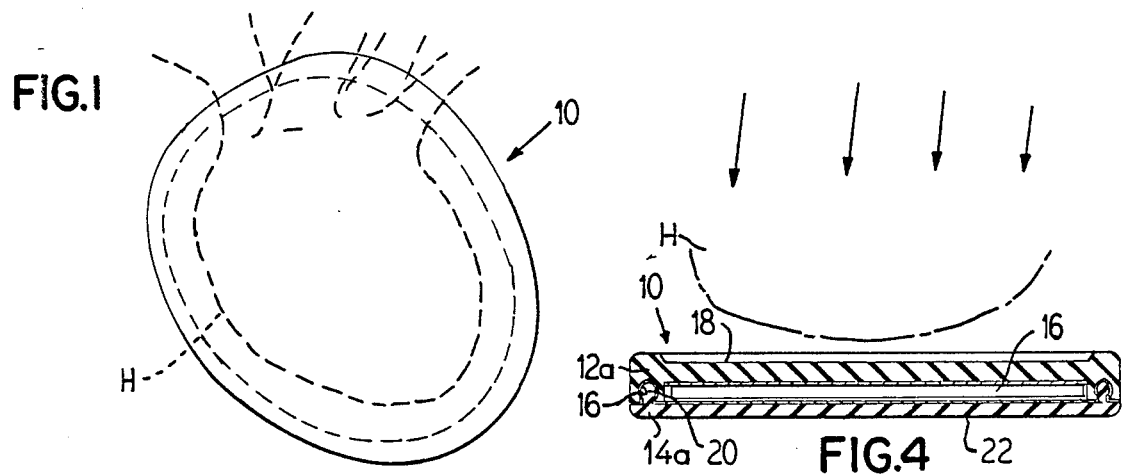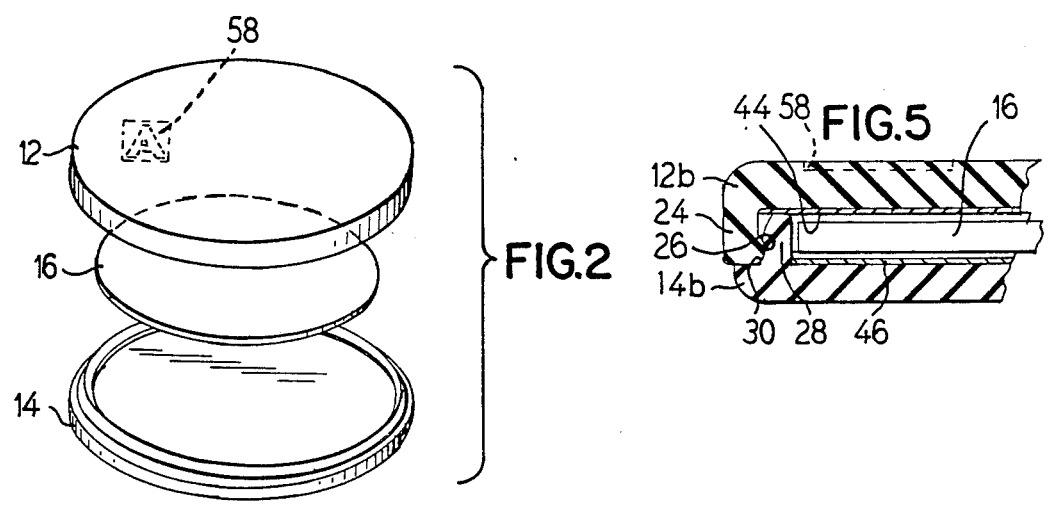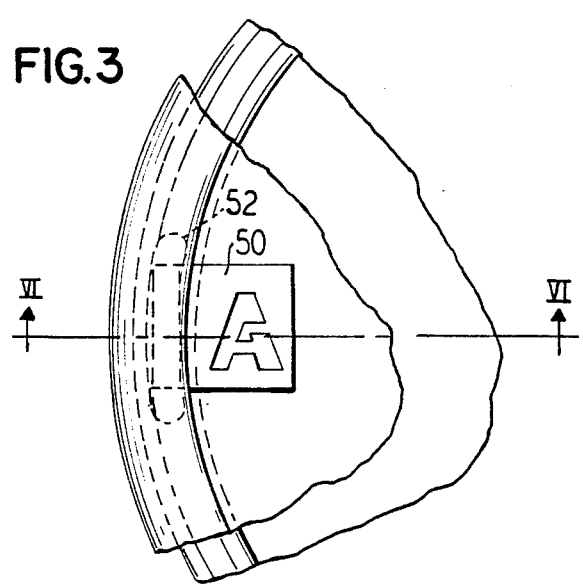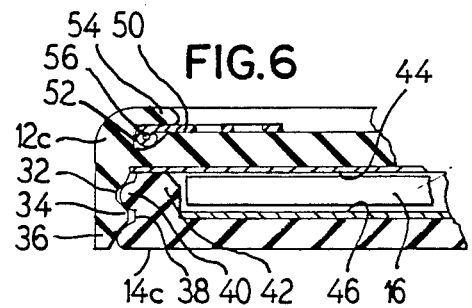

FLEXIBLE INTEROPERATIVE X-RAY CASSETTE

BACKGROUND OF THE INVENTION

1. Field of the Invention

The present invention relates to x-ray cassettes and more particularly to an x-ray cassette to be used for making x-ray negatives of internal body organs during surgery.

X-ray cassettes are very standardized, consisting of seven layers: rigid top and bottom external member; inside layers of felt covering next to the top and bottom layers; x-ray screens made of plastic and painted with a material;, such as calcium tungstate, lanthanum, yttrium or gadolinium, which reduces the exposure time required for the x-ray film next to each layer of felt; and a layer of film in the center. Generally such cassettes are rigid, fairly expensive to manufacture due to the numerous layers required and are not always suitable in size or shape for the particular applications required during surgery or in situations where the patient should not be moved.

Therefore, it would be an improvement in this field if there were provided an x-ray cassette that overcame these difficulties.

SUMMARY OF THE INVENTION

The present invention provides an x-ray cassette to be used primarily for making x-rays of internal body organs during surgery and can also be used for making x-rays at times when a patient should not be moved. The cassette of the present invention is formed of only three layers: top and bottom pieces made of soft, flexible rubber with an exposure reduction material, such as that described above, bonded on the inner surfaces; and a film layer captured between the two top and bottom pieces. A locking connection can be molded directly in the top and bottom pieces so that the x-ray film can be readily inserted into and removed from the cassette for exposing the film and developing the film, and also the cassette can be quickly and easily sealed. Both the assembly and disassembly of the cassette can therefore be undertaken without the use of any tools while still ensuring a high integrity of the seal between the top and bottom pieces.

By forming the top and bottom pieces of a flexible material such as rubber or a flexible plastic, the x-ray cassette of the present invention provides the advantage of flexibility which is not provided in current cassette constructions. This is particularly useful during surgical procedures wherein a relatively small incision is made or where the access to the organ in question is somewhat limited, thus permitting the x-ray cassette to be folded or bent during insertion into the desired location. The top and bottom pieces are sufficiently thick so as to prevent accidental tearing or exposure of the film sealed within the cassette and yet are sufficiently thin so as to retain a high degree of flexibility.

The cassette of the present invention is also very inexpensive to manufacture since there are only two pieces which are substantially identical to each other except for the seal area. The exposure reduction material is bonded or applied directly on to the interior surface of the cassette pieces such that additional pieces and handling are not required.

The cassettes can be formed so as to accept various markers such as lead markers to permit identification and measurement directly on the x-ray negative.

The cassette of the present invention can also be custom shaped to conform with various internal organs so that excessive x-ray negative material need not be utilized which further assists in reduction of cost.

Since the cassette of the present invention is formed of a rubber or plastic material it can be sterilized and can be reused repeatedly merely by opening the cassette to remove the exposed film, inserting unexposed film and sterilizing the pieces thereby rendering it available for reuse. This series of steps can be repeated innumerable times thereby reducing the variable material cost to only that of the x-ray film itself.

Alternatively, the x-ray film cassette could be manufactured for disposal after each use. Since the manufacturing cost of the cassette is low, even a disposable cassette incorporating the principles of the present invention could be economically justifiable.

Because of the reduced number of layers of the cassette and, the use of the exposure reduction material bonded directly onto the cassette, shorter exposure of time is required through the use of the inventive cassettes thereby reducing the patient's exposure to x-rays. This is especially desireable in situations wherein numerous x-ray pictures of a patient are required over a short period of time. Therefore, it is seen that the present invention provides substantially advantages over the prior art constructions and techniques. Also the use of a flexible material for the cassette will cause the exposure reduction material coating to come into contact with the x-ray film thus eliminating the use of felt.

BRIEF DESCRIPTION OF THE DRAWINGS

FIG. 1 is a schematic diagram of an x-ray film cassette incorporating the principles of the present invention in place within a patient's body.

FIG. 2 is an exploded view of the components of the x-ray film cassette and x-ray film.

FIG. 3 is a partial elevational view illustrating an identification marker.

FIG. 4 is a side sectional view of an embodiment of the x-ray film cassette.

FIG. 5 is an enlarged sectional view of an alternative embodiment of the x-ray film cassette.

FIG. 6 is a side sectional view of an alternative embodiment of the x-ray film cassette taken generally along the lines VI—VI of FIG. 3.

DETAILED DESCRIPTION OF THE PREFERRED EMBODIMENTS

In FIGS. 1 and 4 there is illustrated an x-ray film cassette generally at 10 incorporating the principles of the present invention. The x-ray film cassette is shown as being positioned in place within a patient's body and positioned below an organ such as the heart H. The outer circumference of the cassette preferably is larger in size than the organ being x-rayed, and may be of an irregular shape to generally conform to the shape of the organ so that the size of the x-ray film needed can be substantially reduced. Alternatively, the cassettes may be provided in a series of standard sizes for various uses.

The components of the x-ray film cassette are illustrated in exploded view in FIG. 2 where it is seen that there is a top outer piece 12, a bottom outer piece 14 and an intervening piece of x-ray film 16. The top and bottom pieces 12, 14 can be formed from a light impervious material such as soft rubber or other soft flexible material so that no damage will occur to soft tissue in the body cavity when the device is inserted into the body cavity to underlie organs to be x-rayed. The material used should also be susceptible of being sterilized. If the x-ray film cassette is being used to make x-ray negatives by placing the cassette externally to the patient's body, such as in the case where the patient should not be moved, then the cassette material could be formed of a somewhat more rigid material.

The top and bottom pieces 12, 14 can be formed of virtually identical shapes and configurations except for an area of the perimeter of each piece where there is formed a mating configuration to effect a seal between the two pieces. In FIG. 4 a top piece 12a is shown as having a groove 16 formed around a perimeter, the groove opening perpendicularly to a large top surface 18 of the top piece 12a. A bottom piece 14a has a projecting rib 20 extending perpendicularly to a large flat bottom surface 22 of the bottom piece 14a which mates with the groove 16 in a snap-like fashion. The rib 20 has an undercut portion and the groove 16 has a reduced opening area to provide the locking of the two pieces.

In FIG. 5 an alternative locking arrangement is illustrated wherein a top piece 12b has a downwardly turned peripheral rim portion 24 with an inwardly extending protrusion or rib 26. A bottom piece 14b has an upwardly extending flange 28 with an inwardly disposed extending groove 30 extending around the outer periphery of the upstanding flange 28 to receive the protruding rib 26 of the upper piece 12b in a snap lock fashion.

FIG. 6 illustrates yet another seal arrangement in which an upper piece 12c has both a groove 32 and a rib 34 on an inner surface of a downwardly turned flange 36 and a lower piece 14c has a groove 38 and rib 40 on an upwardly extending flange 42 such that the grooves and ribs of the upper and lower pieces 12c, 14c mate to form a snap lock connection which has enhanced light shielding characteristics by providing a serpentine connection between the two pieces.

The top and bottom pieces of the cassette are both provided with a layer of exposure reduction material, such as calcium tungstate, lanthanum, yttrium or gadolinium, or any such similar material, 44, 46 on an interior surface of the pieces. The provision of this exposure reduction material greatly reduces the required exposure time for the x-ray film 16 which is carried within the cassette. The film 16 is thus sandwiched between the top and bottom pieces in a pocket formed by the two assembled pieces and is enveloped by the exposure reduction material layers which are applied directly to the outer pieces. By applying the exposure reduction materials directly to the outer pieces, no additional parts or films are required which reduces handling cost and manufacturing costs. Also the felt is not needed because the exposure reduction material coating is pushed into contact with the film because of the rubber.

As illustrated in FIGS. 3 and 6, a marker 50 can be used with the cassette to provide for identification directly on the x-ray negative or to provide a measurement reference directly on the film. Preferably the marker is in the form of a lead marker and can be securely carried on the cassette by the formation of a pocket 52 formed in the top part of the cassette, the pocket being covered by an overlaping flange 54 to prevent inadvertent dislodging of the marker 50. The marker 50 could have an enlarged end portion 56 to be captured within the pocket 52 to assure retention of the marker on the cassette. Alternatively, a marker 58 could be molded directly into the cassette material as shown in dotted lines in FIGS. 2 and 5.

As is apparent from the foregoing specification, the invention is susceptible of being embodied with various alterations and modifications which may differ particularly from those that have been described in the preceeding specification and description. It should be understood that we wish to embody within the scope of the patent warranted hereon all such modifications as reasonably and properly come within the scope of our contribution to the art.

We claim as our invention:

1. An x-ray film cassette for use in making x-ray negatives of internal organs in a human body consisting of:
   a top piece formed of a soft, flexible material;
   a bottom piece formed of a similar material;
   a seal means formed between said top piece and bottom piece for removably securing said top piece to said bottom piece; and wherein said molded material comprises
   means for permitting said cassette to be folded and inserted through an incision in said human body.

2. An x-ray film cassette according to claim 1, wherein said seal means molded directly into said top and bottom pieces.

3. An x-ray film cassette according to claim 2, wherein said seal means comprises an interlocking rib and groove formed on said top and bottom pieces to form a snap-lock connection between said two pieces.

4. An x-ray film cassette according to claim 1, wherein said seal means is formed as a part of said top and bottom pieces at a periphery thereof.

5. An x-ray film cassette according to claim 1, further including a layer of exposure reduction material applied directly to said top and bottom pieces.

6. An x-ray film cassette according to claim 5, wherein said layer of exposure reduction material is applied to a side of said top and bottom pieces which faces the other of said top and bottom pieces.

7. An x-ray film cassette according to claim 1, wherein said seal means secures said top and bottom pieces together without the use of any tools and permits separation of said top and bottom pieces without the use of any tools.

8. An x-ray film cassette according to claim 1, wherein said bottom piece conforms in size and shape to said top piece.

9. An x-ray film cassette according to claim 8, wherein said top and bottom pieces are formed of a size and shape generally conforming to a body organ of which an x-ray picture is desired.

10. An x-ray film cassette according to claim 1, wherein said top and bottom pieces are formed of a soft, flexible, light shielding material.

11. An x-ray film cassette according to claim 1, wherein said top and bottom pieces are formed of a material that can be sterilized.

12. An x-ray film cassette according to claim 1, further including a marker, impervious to x-rays, carried by said cassette.

13. An x-ray film cassette according to claim 12, wherein said marker is removably secured to said top piece.

14. An x-ray film cassette according to claim 12, wherein said marker is molded into one of said pieces.

15. An x-ray film cassette for use in making x-ray negatives of internal organs in a human body consisting of:
- a top piece formed of a soft, flexible molded material;
- a bottom piece formed of a similar soft, flexible molded material and conforming generally in size and shape to said top piece;
- a groove molded directly in a peripheral region of one of said top and bottom pieces;
- a rib molded directly in a peripheral region of the other of said top and bottom pieces;
- said rib and groove being configured so as to engage with each other in interlocking fashion to removably secure said top piece to said bottom piece; and wherein said molded material comprises
- means for permitting said cassette to be folded and inserted through an incision in said human body.

16. An x-ray film cassette according to claim 15, further including a layer of exposure reduction material applied directly to said top and bottom pieces.

17. An x-ray film cassette according to claim 16, wherein said layer of exposure reduction material is applied to a side of said top and bottom pieces which faces the other of said top and bottom pieces.

18. An x-ray film cassette according to claim 15, wherein said top and bottom pieces are formed of a size and shape generally conforming to a body organ of which an x-ray picture is desired.

19. An x-ray film cassette according to claim 15, wherein said top and bottom pieces are formed of a material that can be sterilized.

20. An x-ray cassette for use in making x-ray negatives of internal organs in a human body consisting of:
- a top piece formed of a soft, flexible, light impervious molded material;
- a bottom piece formed of a similar soft, flexible, light impervious molded material and conforming generally in size and shape to said top piece;
- a groove molded directly in a peripheral region of one of said top and bottom pieces;
- a rib molded directly in a peripheral region of the other of said top and bottom pieces;
- said rib and groove being configured so as to engage with each other in interlocking fashion to removably secure said top piece to said bottom piece;
- a layer of exposure reduction material applied directly to a surface of both of said top and bottom pieces which faces the other of said top and bottom pieces; and wherein said molded material comprises
- means for permitting said cassette to be folded and inserted through an incision in said human body.

* * * * *